United States Patent [19]
Raab et al.

[11] 4,143,001
[45] Mar. 6, 1979

[54] APPARATUS AND METHOD FOR RECLAIMING POLYMER WASTE

[75] Inventors: Karlheinz Raab, Kleinostheim; Konrad Wolff, Frankfurt am Main; Heinrich Koch, Siegburg; Paul Hagel, Hennef, all of Fed. Rep. of Germany

[73] Assignee: Zimmer Aktiengesellschaft, Fed. Rep. of Germany

[21] Appl. No.: 872,266

[22] Filed: Jan. 25, 1978

[30] Foreign Application Priority Data

Jan. 28, 1977 [DE] Fed. Rep. of Germany ....... 2703461

[51] Int. Cl.² .............................................. B29H 19/00
[52] U.S. Cl. .................................... 260/2.3; 425/72 R
[58] Field of Search ......................................... 260/2.3

[56] References Cited

U.S. PATENT DOCUMENTS

| | | | |
|---|---|---|---|
| 3,108,082 | 10/1963 | Riehl et al. | 260/2.3 |
| 3,652,466 | 3/1972 | Hittel et al. | 260/2.3 |
| 3,959,357 | 5/1976 | Tokushige et al. | 260/2.3 |
| 3,976,563 | 8/1976 | Scalco | 260/2.3 |
| 4,051,212 | 9/1977 | Grigat et al. | 260/2.3 |

*Primary Examiner*—M. J. Welsh
*Attorney, Agent, or Firm*—Allegretti, Newitt, Witcoff & McAndrews

[57] ABSTRACT

A continuous process and apparatus for remelting fluffy, high bulk tangled polymer waste, such as nylon or polyethylene terephthalate fibers, which comprises chopping the waste into pieces 15 to 40 mm. mesh size, passing the chopped waste through a charging zone, a compressing screw, and finally an extruder. The charging zone is formed by a vertically-disposed hopper, having two opposed parallel walls and two opposed converging walls. Inside the hopper is a plurality of agitating shafts having tapered fingers that loosen and disentangle the chopped waste. The waste then is compressed to one-fourth to one-fifth its volume and transferred to an extruder where it is melted, degassed and extruded to a predetermined shape.

6 Claims, 3 Drawing Figures

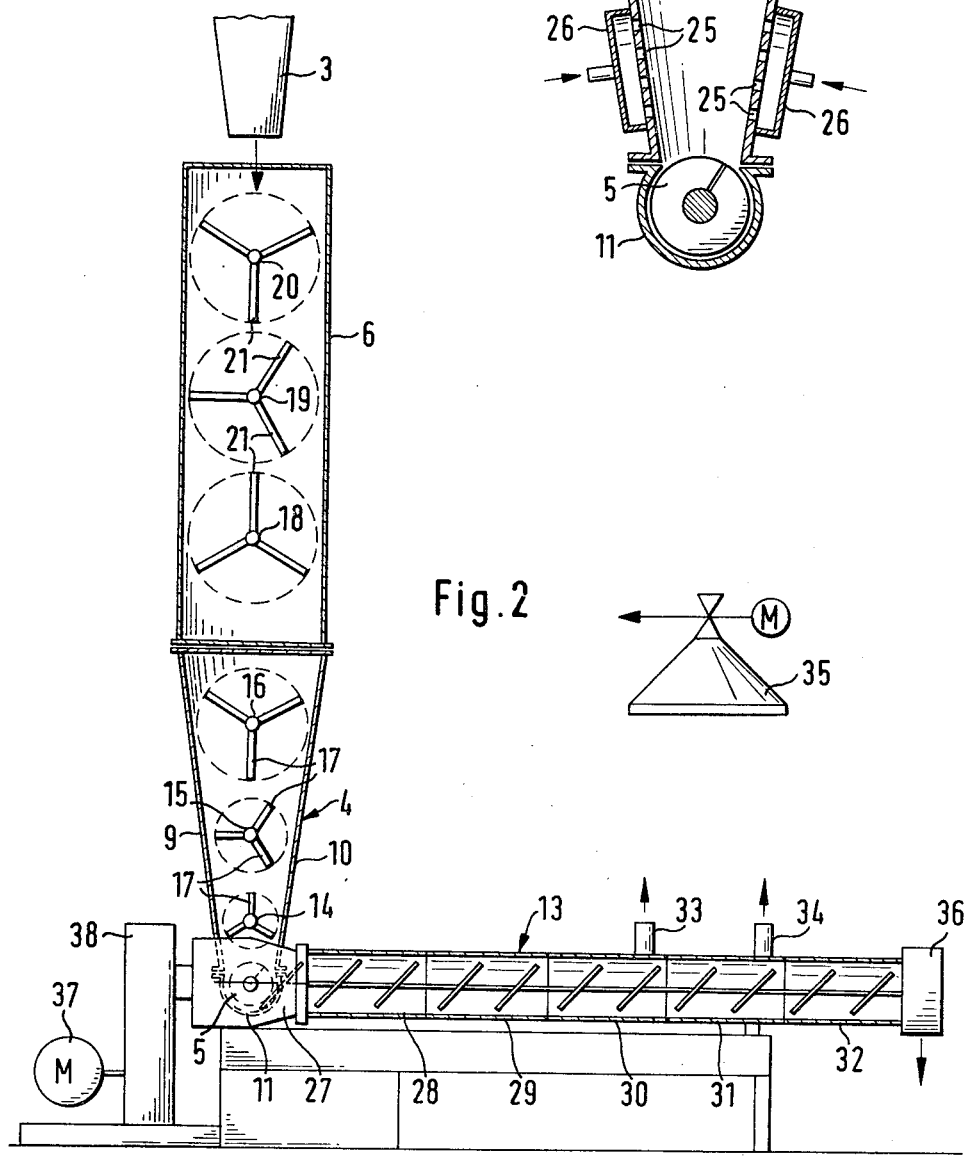

APPARATUS AND METHOD FOR RECLAIMING POLYMER WASTE

BACKGROUND OF THE INVENTION

In production plants of the synthetic fiber industry, waste products such as polymer lumps, cables, entangled masses of filaments, first-spun material, undrawn and drawn fibers and filaments partly treated with finishes, rejected bobbins, etc. are accumulating in considerable quantities in the various process stages. These waste products, on the one hand, are too valuable to throw away while, on the other hand, their disposal is costly and could result in intolerable environmental pollution. Hence, the reclamation of such wastes is deemed an absolute necessity. Where the production of films from plastics is involved, the accumulating wastes suitable for reclamation amount to considerable quantities.

In principle, there exist two processes for the reclamation of polymer wastes: (1) the controlled degradation of the polymer for the purpose of recovering the monomeric starting materials, for example, the so-called depolymerization of poly - $\epsilon$ - caprolactam to $\epsilon$ - caprolactam, or the glycolysis of polyethylene terephthalate, and (2) the remelting with subsequent filtration, forming and solidification of the obtained polymer melt. Due to the large number of different high-polymers to be recovered, for example, polyamides, polyesters, polyolefins, a variety of degradation processes is required which, partly due to their complexity, involve high capital investments and maintenance costs and frequently operate with only modest yields of recoverable valuable materials.

Also the remelting processes are, in essence, designed specifically for one type of polymer and/or structure and are, thus, generally not applicable to the other types of plastics and forms of waste materials.

Particular difficulties result because the bulk weight of the polymer wastes on completion of the required cutting operation amounts to only approx. 0.1 - 0.15 kg/l. The chopped waste resembles feathers in structure which renders its continuous conveyance to the melting unit, i.e. screw-type extruder, rather problematic. In the case of remelting fibers and filaments coated with spin-finish deposits, the lubricants must first be removed by employing expensive washing and drying processes.

In the literature concerning the reclamation of wastes from synthetic fibers and foils (Maschinenmarkt MM Industriejournal, Wurzburg, 78 (1972) 4 page 65 and 66) it is pointed out that these wastes, after having been cut in a cutting mill, are of a very low bulk density so that the material moves into the extruder screws in an irregular fashion. The literature also states that stuffing screws should be provided at the extruder inlet as the cut pieces or chips tend to bridge at the silo discharge and cause disturbances in the dosing system. In the cited literature, this mode of operation is deemed to be so troublesome that it is suggested to convert the waste material into free flowing granules. This is done by passing the cut synthetic material via a dosing screw to a compacting device whose rotor seizes the chips which are then sintered under the heat of friction and pressure against a stationary counter pan. Chips that still remain in the sintered material must be separated later. The finished granules will then be available for remelting in screw-type extruders.

Due to the heat of friction required for sintering and the later remelting operation, thermoplastic materials are frequently thermally damaged so that they can no longer be processed to finished products of high quality. Neither does blending the reclaimed materials, agglomerated by compression and sintering with fresh granulate, offer a remedy. Because of the effect of frequent separation due to the different geometric configuration and size of grains the melt discharged from the extruder is of fluctuating quality.

THE INVENTION

The present invention provides a continuous process for the remelting of high bulk polymer waste from widely different thermoplastic materials and their blends, irrespective of the source of the waste. The process reliably prevents the formation of bridges when charging the wastes to the screw-type extruder, ensures a reliable continuous operation, involving only minor capital investment and maintenance costs, and prevents hydrolytic and thermal damaging of the polymer.

These objects are accomplished by reducing the voluminous polymer wastes to a mesh size of between 15 and 40 mm whereupon the cut wastes are conveyed under constant mechanical loosening or separating through a charging zone having a narrowing cross-section in the direction of conveyance. Agitator shafts arranged in the charging zone transversely to the direction of conveyance and distributed therein provide the loosening action. The polymer wastes are then passed to a continuously operating compressing stuffing screw where the polymer waste is compressed to one-fourth to one-fifth its original volume. The compressed waste flows to the heated screw-type extruder in which it is degassed several times to remove the included air and volatile constituents under the melting conditions, and melted.

It was surprising that it is possible by the invention to reclaim widely differing polymer materials including their blends, and accumulating plastic wastes of different geometric structures, without the undesirable bridging formation at the entrance to the melt extruder. It has been found that the different types of wastes regularly accumulating in a synthetic fiber plant can without any difficulty be blended and handled by applying the process described herein. The process of the invention also is characterized by a high degree of flexibility, a wide range of industrial applications, and satisfying the requirements relating to reclamation which have been controlled in a rather unsatisfactory manner or not at all by the prior art.

According to the invention, the reduction of the high bulk polymer wastes to the mesh size range indicated is completely sufficient to ensure troublefree, continuous conveyance and charging of the wastes. The smaller mesh sizes are employed for the reclamation of fibers or blended wastes consisting mainly of fibers, while larger mesh sizes are required for handling entangled masses of fibers. After having been cut, the polymer wastes are preferably conveyed pneumatically into the charging zone.

The pneumatic conveyance not only results in uniform charging of the charging zone during continuous operation but offers the added advantage of stream drying polymer wastes which are susceptible to hydrolytic degradation while they are being conveyed into the charging zone. With the aid of such a stream drying operation, for example, hydrolytic degradation of wastes from polyethylene terephthalate, which otherwise range between 0.1 – 0.15 $\eta_{intr.}$ can be avoided almost completely. With poly - $\epsilon$ - caprolactam and polyhexamethyleneadipamide, for example, no discernible damaging of the polymer occurred using the process of this invention.

Instead of, or in addition to, a stream drying operation provided in the path of the pneumatic conveying system, the process can also be carried out in such a way that the polymer wastes susceptible to hydrolytic degradation are subjected in the charging zone to a drying operation with countercurrent heated air. This drying step can be very effective when the velocity of air is sufficiently low to prevent the cut polymer wastes from becoming suspended or from being whirled up. Air velocities below approx. 1 m/sec. generally suffice. The air is preferably preheated to between approx. 80° C. and 160° C., depending upon the type of polymer, before it is passed, uniformly distributed, into the charging zone. When handling polyethylene terephthalate wastes, for example, the air temperature is maintained between approx. 140° C. and 150° C.

The process also offers the advantageous possibility of obtaining a dyed melt by continuously dosing a dyestuff into the charging zone. This is of particular advantage in such cases where the product available has already been dyed and/or when the melt is to be used for injection molding.

According to the invention, undried fiber wastes on which a spin-finish has been deposited can be reclaimed continuously without any pre-washing step. While being compressed in the stuffing screw, the wastes are heated so that a part of the moisture can be evaporated through a degassing opening when the material enters the extruder. In the path through the screw-type machine, further degassing openings may be provided for the removal of water, finishing lubricants and other volatile substances, such as monomers, etc.

The polymer melt produced by using this process can be handled as virgin chips and sold per se, blended for use in spinning fibers and for injection molding. Moreover, the melt can also be fed directly into the polymer producing process, for example, into the reactor tube where the production of poly - $\epsilon$ - caprolactam is concerned, and into the trans-esterification stage or into a precondensation stage, where the production of polyethylene terephthalate is concerned. The melt can also be charged directly to an injection molding machine or spun to fiber bundles which can then be cut to staple fibers.

A device particularly suitable for practicing the process is characterized in that the charging zone is composed of a hopper of rectangular cross-section having two opposed plane parallel walls and two opposed walls continuously converging in the direction of conveyance. The hopper is open at the top. Mounted for rotation on the plane parallel walls and at right angles thereto are the agitating shafts, arranged parallel and spaced in correlation with one another, and parallel to the axis of the stuffing screw. It has been found that the device so designed prevents any disturbing bridge formation in the charging zone, thus ensuring a continuous uniform conveyance of the cut waste material to the stuffing screw.

A storage vessel may be placed directly on top of the hopper whose cross-section is uniform throughout its height and corresponds to the cross-sectional dimensions of the opening at the top of the hopper. Several agitating shafts are mounted within the vessel uniformly-spaced throughout its height and parallel to the agitating shafts in the hopper. This arrangement produces a generous supply of cut polymer wastes directly above the charging zone which will in no way cause any disturbances in conveying the cut material to the stuffing screw. This design also permits the polymer wastes to be pneumatically conveyed directly into the storage vessel. The storage vessel can also be of hopper type.

In the preferred construction provision has been made for agitating fingers tapered towards their free ends and extending radially from the agitating shafts. These agitating fingers are mounted in respect to each other so that no overlapping of their circumferences with those of adjacent agitating shafts occurs and so that the agitating fingers terminate near the adjacent walls of the hopper and storage vessel in which they are mounted. This arrangement of the agitating shafts and radial agitating fingers ensures a constant loosening of the fluffy, chopped polymer wastes in the charging zone and, if provided, in the storage vessel without impeding movement towards the stuffing screw and without forming any dead spaces in the mass. Thus, bridge formation is precluded. Tapering the agitating fingers towards their free ends facilitates cleaning the agitating elements from filaments of excessive length that may wind around the elements.

Moist polymer wastes may be effectively dried in the charging zone and, if provided, in the superimposed storage vessel, by providing perforations in opposed hopper walls converging in the direction of conveyance near their lower ends, which perforated portions are covered by outside pockets for feeding in hot air through the perforations. Thus the hot air enters the hopper with optimum distribution through the sides of greater dimensions (length).

THE DRAWINGS

Illustrative examples of the apparatus according to the invention will be explained in connection with the schematic drawings, wherein:

FIG. 2 is a side elevational view of the apparatus illustrated in FIG. 1, the feed hopper and the storage vessel being shown from the end and the melt extruder from the side.

FIG. 3 is an end view of the lower end of the feed hopper showing the perforations for supplying air.

DETAILED DESCRIPTION

Figure 1:
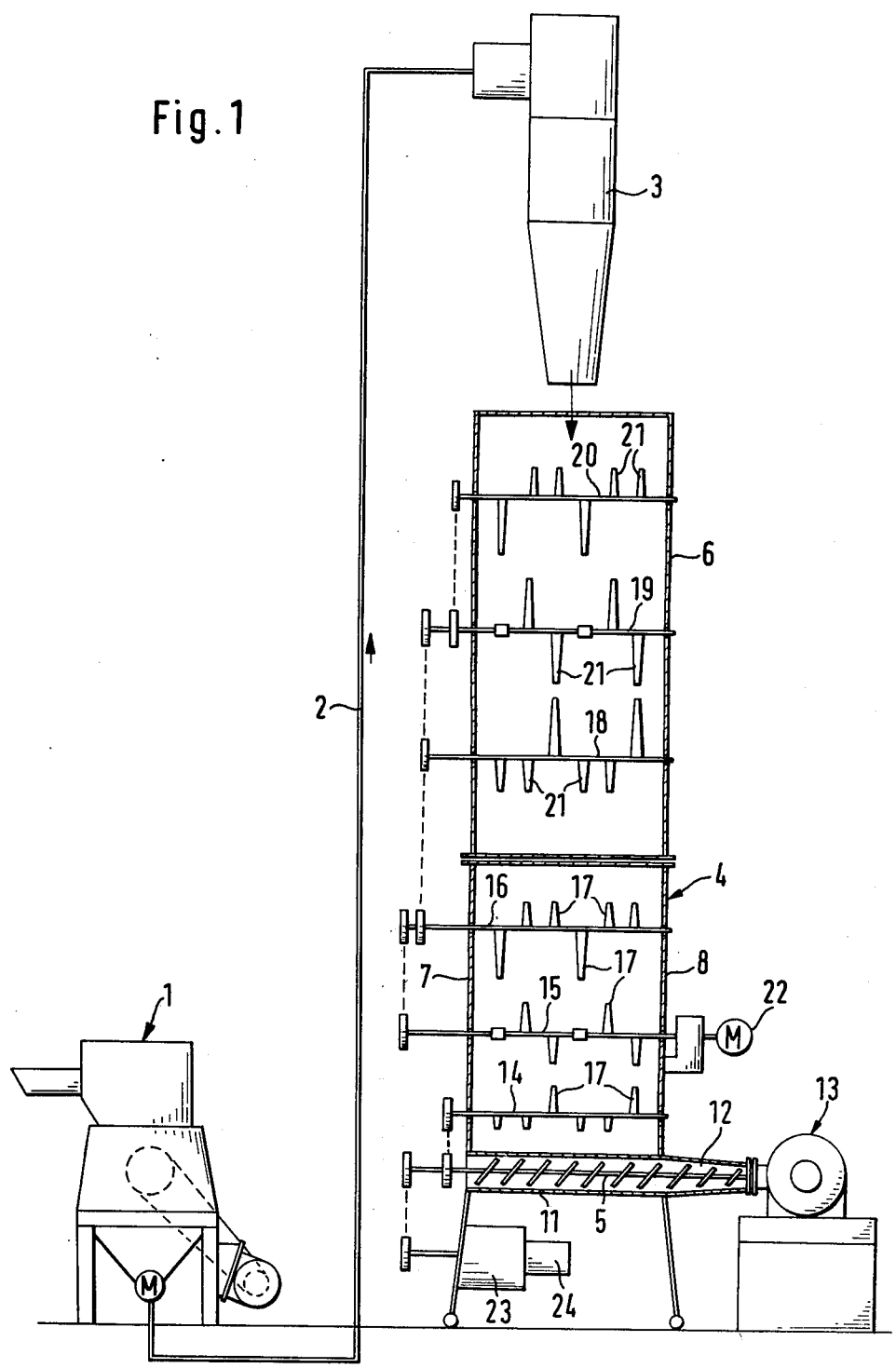
FIG. 1 is an end elevational view of the overall arrangement of the apparatus required to carry out the process, showing the feed hopper and the mounted storage vessel in a side view and the melt extruder in an end view.

The polymer waste is fed to cutting mill 1 and after being cut or chopped therein is pneumatically conveyed to cyclone separator 3 via line 2. The feed hopper, which supplies the stuffing screw, is not disposed, as in a conventional system, immediately beneath cyclone separator 3 but instead is surmounted by storage vessel 6. The cut bulky polymer waste is discharged from cyclone separator 3 into the open upper section of storage vessel 6.

As may be seen from FIG. 1 in conjunction with FIG. 2, hopper 4 comprising the feed zone is characterized by a cross-section which is rectangular at all points of the hopper height and defined by opposed vertical plane-parallel walls 7 and 8 and by walls 9 and 10 continuously converging in the feeding direction. The lower open end of feed hopper 4 connects to the open upper section of housing 11 or stuffing screw 5. As shown in FIG. 1 the zone area feeding the stuffing screw 5 extends the full distance between parallel walls 7 and 8 of feed hopper 4. Compression zone 12 of stuffing screw 5 is located outside feed hopper 4 and connects to the melt extruder 13, its axis running at right angles to stuffing screw 5.

Three agitating shafts 14, 15 and 16 are mounted for rotation in the parallel walls 7 and 8 with their axes parallel to the stuffing screw 5. Each of the agitating shafts 14 to 16 is, for instance, provided with six spaced agitating radial fingers 17 circumferentially staggered at an angle of 120°.

Inside the storage vessel 6 are three similar rotatable agitating shafts 18, 19, 20 provided with agitating fingers 21. As shown in FIG. 1 the agitating shafts 15, 16 and 18 to 20 are interconnected by chain drive to motor 22 so that they operate in unison. The chain drives are selected to enable the agitating shafts to operate at the same number of revolutions and in the same sense of rotation.

Agitating shaft 14 positioned immediately adjacent stuffing screw 5 is directly driven by a chain drive connecting to the stuffing screw shaft which itself is driven by motor 24 through an infinitely-variable speed drive 23.

Agitating fingers 17 and 21 tapered toward their free ends to prevent polymer agglomeration may be formed as conical pins having circular cross-sections. But they may just as well have rectangular cross-sections decreasing towards their ends.

From FIG. 2 is seen that the circular paths described by the extreme ends of the agitating fingers, and shown as dotted lines, do not overlap vertically, on the one hand, and are disposed near the side walls, on the other.

To provide for countercurrent air drying in feed hopper 4 and, if desired, in the mounted storage vessel 6, converging walls 9 and 10 of the feed hopper are provided in the proximity of their lower edges with orifices or slots 25 forming continuous perforated areas extending over the entire length of these walls parallel to stuffing screw 5. As shown in FIG. 3, these perforated areas are covered from outside by supply pockets 26 receiving the hot air in sufficient quantity to allow the countercurrent drying operation to be carried out. The velocity of the hot air current in the feed hopper depends on the number of orifices or slots, their cross-sectional area and on the amount of air supplied.

As shown in FIG. 2, melt extruder 13 is provided with six heating zones 27 to 32 permitting the required temperature profile to be adjusted along the length of the screw. Heating zones 30 and 31 are both provided with a degassing orifice 33 and 34. The rising gases and fumes are received by hood 35 and discharged. At the end of melt extruder 13 an extruder die 36, for instance a ribbon spinning head, is installed.

To ensure a continuous trouble-free operation the speed of stuffing screw 5 and that of melt extruder 13 must be synchronized.

For this purpose it will suffice to provide a control device of a simple design where the speed of stuffing screw 5 is adjusted as a function of the electrical current input to the screw of melt extruder 13 as by means of infinitely variable speed change gear 23. The electrical measurement signal is directly fed to the servomotor of the speed change gears. In this manner simple, effective, trouble-free control of the melt extruder is ensured. Numerals 37 and 38 shown in FIG. 2 refer to the drive motor and the gear box of melt extruder 13.

It is also possible to provide an infinitely variable speed change gear between drive motor 22 and the agitating shafts 15, 16 and 18 to 20 inclusive driven by the motor.

The following two examples are offered as being illustrative of the present invention.

EXAMPLE 1

Polymer ε-caprolactam waste having a viscosity of $\eta_{rel}$ 2.5 to 2.6 and being composed of first-spun material, i.e. continuous undrawn filaments and waste occurring on take-up machine bobbins, was fed in a quantity of 150 kg/h to a cutting mill of type CS 4 manufactured by Condux-Werk Herbert A. Merges KG wherein the material was reduced in size by means of a cutting screen having a mesh size of 25 mm. The resulting cut material of a bulky downy nature had an average density of about 0.1 g/l. The cut material was pneumatically fed to the feed hopper of a stuffing screw in a continuous operation. The feed hopper had an upper orifice of about 600 × 650 mm with the orifice measurement of 650 mm continuously decreasing to the diameter of the stuffing screw feeding area of about 160 mm. Within the compression zone outside the feed hopper the stuffing screw diameter decreased to about 100 mm. Inside the hopper there were three agitating shafts arranged one above the other each of them provided at regular intervals with six fingers 6 mm thick and 20 mm wide on the agitating shafts and 15 mm wide at their free ends. The lower agitating shaft was driven at a speed of 30 RPM while the two upper shafts operated at a speed of 20 RPM. The stuffing screw drive speed was 60 RPM. The stuffing screw conveyed the compressed cut material through a lateral feed orifice to a melt extruder of type Sikoplast 180/110/2. Said extruder was provided with six heating zones heatable individually to temperatures between 250° and 310° C. The extruder screw was heated to about 180° C. The melt was degassed in the fourth and fifth heating zone. The melt exiting from the extruder at a temperature of about 295° C. was fed to a ribbon spinning head. The spun ribbons were by means of draw-off rolls passed through a water trough provided for quenching and reduced in a granulator to chips having an average grain size of 2 × 2 × 3 mm. The residence time of the material processed in the extruder was 2 to 3 minutes. The relative viscosity of the produced chip was $\eta_{rel} = 2.5$ to 2.6 and therefore equivalent to that of the starting material. The product obtained after remelting was capable of being spun to technical filaments of first-rate quality.

EXAMPLE 2

Waste consisting of dried and drawn tow of polyethylene terephthalate having a viscosity of $\eta_{intr} = 0.63$ and coming from a fiber drawing line, was fed at a rate of 150 kg/h to the cutting mill mentioned in Example 1 and cut therein by utilizing a cutting screen of 15 mm mesh size. The average density of the cut material was roughly 0.1 g/l. The cut material, highly bulky, was by means of the agitating shafts continuously fed to the feed hopper described in Example 1 and to the stuffing screw attached to it. Inside the feed hopper hot air was used to achieve countercurrent drying of the waste. The throughput was roughly 200 m³/h of air heated to 145° C. The cut material compressed and heated by the stuffing screw was fed in the same manner as described in Example 1 to the melt extruder the heating zones of which were operating at temperatures between 250° and 280° C. The temperature of the screw was 180° C. The melt exiting from the extruder after a residence time betweeen 2 and 3 minutes showed a temperature of 275° C. The melt was analogously with Example 1 converted into chips having a viscosity of $\eta_{intr} = 0.55$ which differed only insignificantly from the initial viscosity despite the inevitably occurring thermal degradation. The melt obtained, without further preparation, was capable of being integrated in the main product stream of a continuously operating polycondensation plant designed for the production of polyethylene terephthalate.

To determine the intrinsic viscosity ($\eta_{intr}$) first the capillary viscometer by Ubbelohde was used to find out the relative solution viscosity of ($\eta_{rel}$). A solvent was utilized consisting of a 60:40 weight mixture of phenol/-tetrachloroethane at 25° C. The polyester had a concentration level (c) of 0.5 g of polyester per 100 ml of solvent. The intrinsic viscosity was calculated by applying the following approximate equation by Billmeyer:

$$\eta_{intr} = \frac{1}{4} \cdot \frac{\eta_{rel} - 1}{c} + \frac{3}{4} \cdot \frac{\ln \eta_{rel}}{c}$$

What is claimed is:
1. A continuous process for remelting fluffy, high bulk tangled polymer waste comprising:
   cutting the waste into pieces,
   passing the cut waste through a charging zone which is gradually narrowing in the direction of conveyance while mechanically separating and loosening the tangled waste,
   compressing the loosened waste to one-fourth to one-fifth its uncompressed volume,
   heating the compressed waste to the molten state while venting air or other volatile constituents, and
   extruding in predetermined shape the molten waste.
2. The process of claim 1 in which the cut waste is conveyed pneumatically to said charging zone.
3. The process of claim 1 in which said cut waste is subjected to a stream of hot air to prevent hydrolytic degradation.
4. The process of claim 3 in which said hot air is moved countercurrent to the flow of waste through said charging zone.
5. The process of claim 1 in which a dyestuff is dosed continuously into said charging zone.
6. The process of claim 1 in which said waste is cut into pieces of 15 to 40 mm. mesh size.

* * * * *